United States Patent
Hoshing et al.

(10) Patent No.: US 11,548,455 B2
(45) Date of Patent: Jan. 10, 2023

(54) VEHICLE FLOOR SILENCER

(71) Applicant: Toyota Motor Engineering & Manufacturing North America, Inc., Plano, TX (US)

(72) Inventors: Abhijeet Anil Hoshing, Ann Arbor, MI (US); Taylor E. Darling, Ypsilanti, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 789 days.

(21) Appl. No.: 16/536,846

(22) Filed: Aug. 9, 2019

(65) Prior Publication Data

US 2021/0039569 A1 Feb. 11, 2021

(51) Int. Cl.
  *B60R 13/08* (2006.01)
  *B60R 16/02* (2006.01)
(52) U.S. Cl.
  CPC ........ *B60R 13/083* (2013.01); *B60R 13/0846* (2013.01); *B60R 16/0215* (2013.01)
(58) Field of Classification Search
  CPC ... B60R 13/08; B60R 13/0815; B60R 13/083; B60R 13/0846; B60R 16/0215
  USPC .............................................. 296/39.1, 39.3
  See application file for complete search history.

(56) References Cited

U.S. PATENT DOCUMENTS

| 6,092,854 A | * | 7/2000 | Campbell | B60R 13/0846 |
| | | | | 296/70 |
| 6,537,641 B1 | * | 3/2003 | Kroll | B60R 16/0215 |
| | | | | 428/95 |
| 6,547,301 B1 | * | 4/2003 | Keller | B60H 1/00564 |
| | | | | 165/42 |
| 2014/0062139 A1 | * | 3/2014 | Togo | B62D 25/20 |
| | | | | 296/193.07 |
| 2019/0023197 A1 | | 1/2019 | Bathelier et al. | |
| 2021/0024019 A1 | * | 1/2021 | Nishimura | H02G 3/0437 |

FOREIGN PATENT DOCUMENTS

| JP | 2011240819 A | * | 12/2011 |
| JP | 2011240819 A | | 12/2011 |
| JP | 4952361 B2 | | 6/2012 |
| JP | 2015220800 A | * | 12/2015 |
| JP | 2015220800 A | | 12/2015 |
| WO | 2019039073 A1 | | 2/2019 |

* cited by examiner

*Primary Examiner* — Jason S Daniels
(74) *Attorney, Agent, or Firm* — Christopher G. Darrow; Darrow Mustafa PC

(57) ABSTRACT

A vehicle floor silencer includes at least one first wall, at least one second wall positioned opposite the first wall, and at least one floor extending between the at least one first wall and the at least one second wall. The at least one first wall, the at least one second wall, and the at least one floor combine to define a receptacle structured to open in an upward direction and to receive a wire harness therein after the floor silencer has been positioned on the floor of the vehicle.

7 Claims, 6 Drawing Sheets

VEHICLE FLOOR SILENCER

TECHNICAL FIELD

The present invention relates to vehicle interiors and, more particularly, to a floor silencer to be installed between a vehicle floor and interior carpeting.

BACKGROUND

During assembly of a vehicle, a floor silencer may be applied to a floor of the vehicle interior, after which a carpet may be laid over the floor silencer. The floor silencer may aid in insulating the vehicle interior from noise and vibration from the floor and from the exterior of the vehicle. A wire harness may be routed along the floor silencer. The wire harness may be secured to walls of the floor silencer at distinct locations above the vehicle floor with fasteners or tie downs. Routing and securing the harness to the floor silencer with fasteners or tie downs is difficult and time consuming.

SUMMARY

In one aspect of the embodiments described herein, a vehicle floor silencer includes at least one first wall, at least one second wall positioned opposite the at least one first wall, and at least one floor extending between the at least one first wall and the at least one second wall. The at least one first wall, the at least one second wall, and the at least one floor combining to define a receptacle structured to open in an upward direction and to receive a wire harness therein after the floor silencer has been positioned on the floor of the vehicle.

BRIEF DESCRIPTION OF THE DRAWINGS

The accompanying drawings, which are incorporated in and constitute a part of this specification, illustrate embodiments described herein and together with the description serve to explain principles of embodiments described herein.

DETAILED DESCRIPTION

Figure 1:
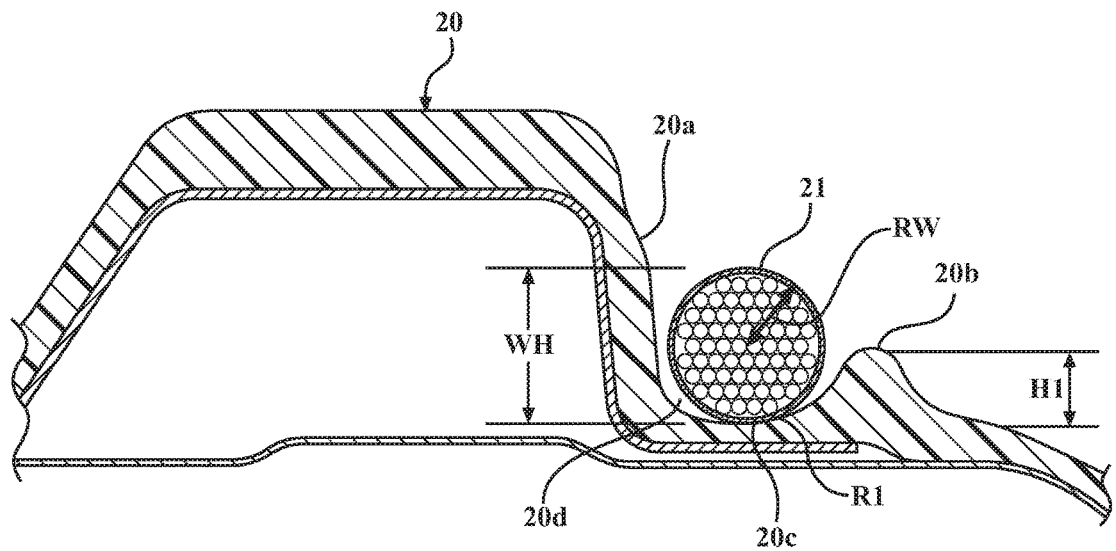
FIG. 1 is a cross-sectional view of a floor silencer structured in accordance with an embodiment described herein for mounting of a wire harness thereon.

Embodiments described herein relate to a vehicle floor silencer including one or more receptacles structured to enable a wire harness to be mounted to the floor silencer. Each receptacle may be defined by a first wall, a second wall positioned opposite the first wall, and a floor extending between the first wall and the second wall. The receptacle(s) may open in an upward direction and may be structured to receive a wire harness therein after the floor silencer has been positioned on the floor of the vehicle. One or more of the receptacles may include additional features structured to aid in retaining the wire harness in position once installed. The floor silencer structure enables a wire harness to be mounted to the floor silencer without using fasteners or tie-wraps.

It will be appreciated that for simplicity and clarity of illustration, where appropriate, reference numerals have been repeated among the different figures to indicate corresponding or analogous elements. Similar reference numerals shown in different embodiments may refer to similar features or elements common to the different embodiments. In addition, the discussion outlines numerous specific details to provide a thorough understanding of the embodiments described herein. Those of skill in the art, however, will understand that the embodiments described herein may be practiced using various combinations of these elements.

As known in the pertinent art, a floor silencer may be applied to a floor of the vehicle interior, after which a carpet may be laid over the floor silencer. The floor silencer may aid in insulating the vehicle interior from noise and/or vibration from the floor and from the exterior of the vehicle. In one or more embodiments, the floor silencer may be molded or otherwise fabricated from a synthetic fiber/urethane mixture. However, the floor silencer may alternatively be formed from a foam material, a polymer, or any other suitable material or materials.

In one or more arrangements, embodiments of a floor silencer described herein may include at least one first wall, at least one second wall positioned opposite the at least one first wall, and at least one floor extending between the at least one first wall and the at least one second wall. The at least one first wall, the at least one second wall, and the at least one floor may combine to define a receptacle opening structured to open in an upward direction for receiving the wire harness therein after the floor silencer has been positioned on the vehicle floor. In one or more arrangements, the floor silencer floor may have a semi-circular cross-sectional shape. The at least one floor may have a radius of curvature structured to be greater than an outermost radius of the wire harness to be received in the receptacle.

For example, FIG. 1 is a cross-sectional view of a portion of a floor silencer 20 in accordance with an embodiment described herein, and showing a wire harness 21 mounted thereon. The floor silencer embodiment 20 of FIG. 1 includes at least one first wall 20a, at least one second wall 20b positioned opposite the at least one first wall 20a, and at least one floor 20c extending between the at least one first wall 20a and the at least one second wall 20b. The at least one first wall 20a, the at least one second wall 20b, and the at least one floor 20c may combine to define a receptacle 20d structured to open in an upward direction and structured to receive the wire harness 21 therein after the floor silencer 20 has been positioned on the vehicle floor 18. In one or more arrangements, the floor silencer floor 20c may have a semi-circular cross-sectional shape. The floor 20c may have a radius of curvature R1 structured to be greater than an outer radius RW of the wire harness 21 to be received in the receptacle 20d. In this arrangement, the wire harness may lay in the receptacle 20d without needing to be secured by tie-downs or fasteners.

Figure 2B:
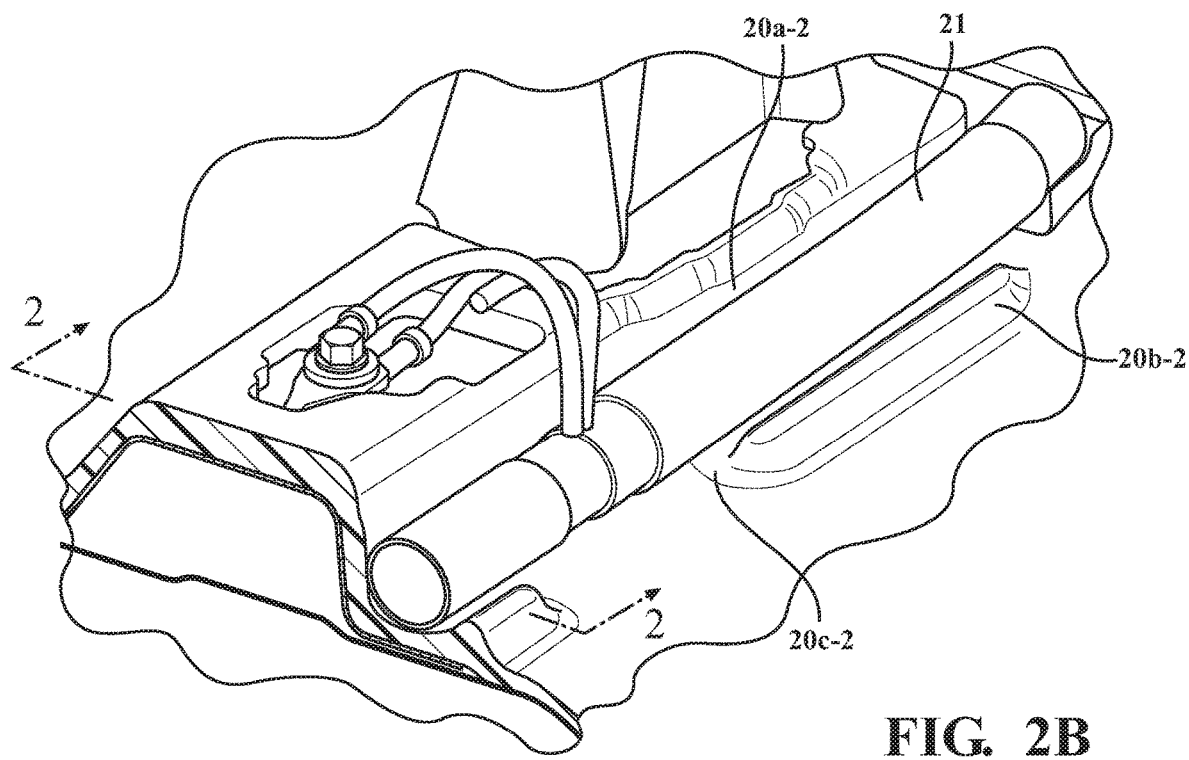
FIG. 2B is a magnified view of a portion of the floor silencer of FIG. 2A, and showing a wire harness mounted thereon.
Figure 2A:
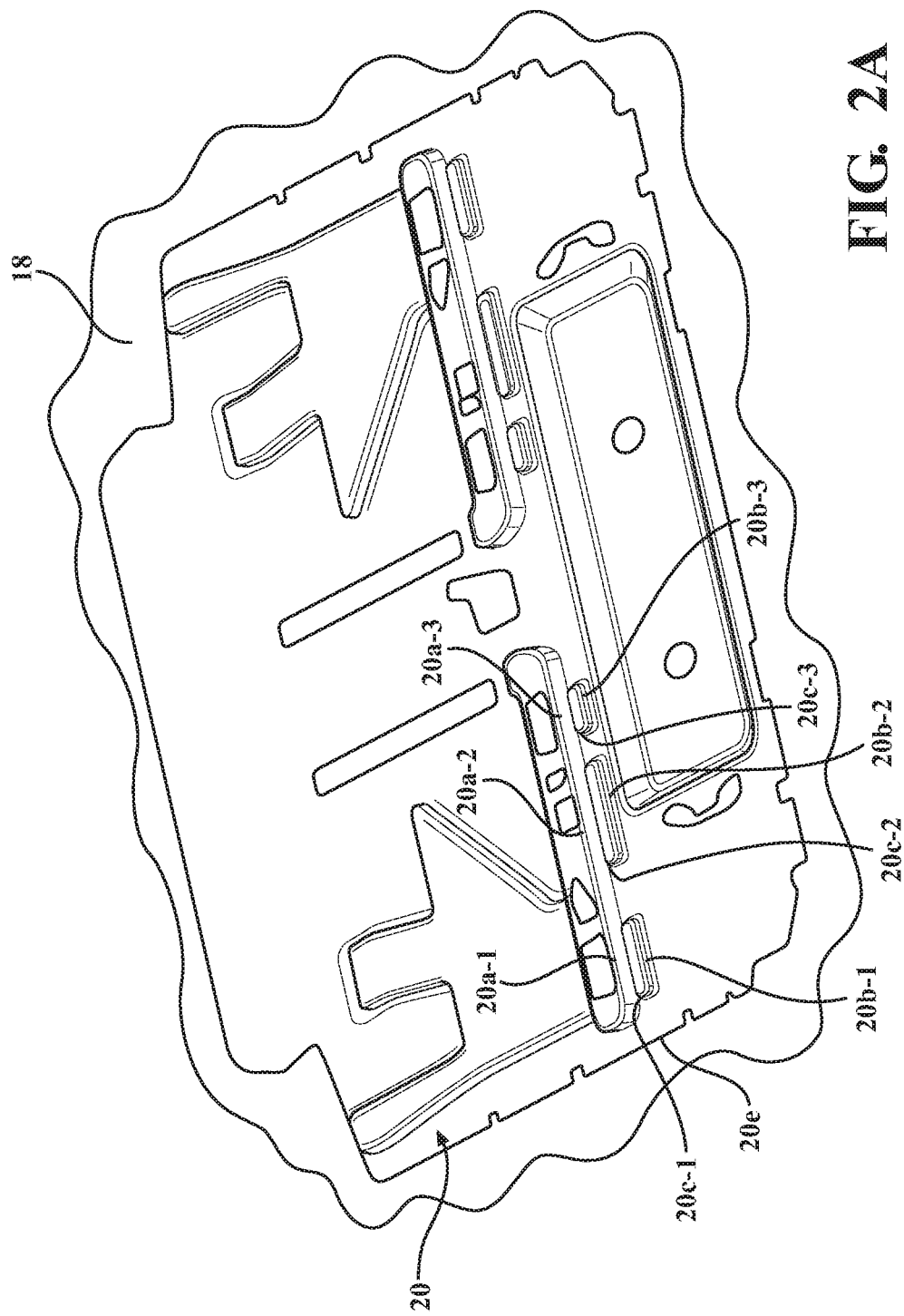
FIG. 2A is a perspective view of a floor silencer structured in accordance with a particular embodiment described herein.

FIG. 2A is a perspective view of the floor silencer 20 shown resting on and/or attached to a floor 18 of a vehicle interior. FIG. 2B is a magnified view of a portion of the floor silencer 20 of FIG. 2A, showing a portion of a wiring harness 21 mounted thereon. In the embodiment shown in FIGS. 2A-2B, the floor silencer 20 has multiple first walls 20a-1, 20a-2, 20a-3, etc., multiple second walls 20b-1, 20b-2, 20b-3, etc. positioned opposite associated ones of the first walls, and multiple floors 20c-1, 20c-2, 20c-3, etc. positioned between associated ones of the first and second walls. In addition, in embodiments with multiple first walls, second walls, and floors, adjacent ones of first walls 20a may be coplanar and/or continuous, adjacent ones of second walls 20b may be coplanar and/or continuous, and adjacent ones of floors 20c may be coplanar and/or continuous, so that receptacles 20d having the same cross-sectional structures are provided along the portion of the floor silencer where the wire harness 21 is to be installed. However, in other embodiments (not shown) the floor silencer may have a single continuous first wall, a single continuous second wall, and a single continuous floor extending between the continuous first and second walls.

In embodiments shown herein, the floor silencer 20 may be positioned on and attached to the vehicle floor 18. The wire harness 21 may then be inserted into the receptacles 20d. The first and second wall(s) 20a, 20b of the receptacle(s) 20d may act to confine the harness 21 in the receptacle(s) during assembly operations prior to (and including) application of the carpet over the floor silencer.

The receptacle(s) 20d may open upwardly to receive the wire harness 21 therein and also remain open through the floor silencer. Providing open-top receptacle(s) or guiding track(s) for the wire harness 21 allows the wire harness to lay in the receptacle(s) 20d during vehicle assembly instead of being fastened to the floor silencer using tie wraps or other fasteners, which enables a more rapid, efficient and simple wire harness installation procedure. In addition, every portion of the length of the wire harness positioned in the receptacle(s) is visible during the entire assembly phase, prior to installation of the carpet. This allows for constant verification of placement of the harness in the receptacle, as well as for simplified rework (either during initial assembly or after assembly, if the harness needs replacement).

Referring again to FIG. 1, in one or more arrangements, each of the receptacle second wall(s) 20b is structured to extend from an associated receptacle floor 20c a distance H1 of about 35% of a distance WH that the wire harness 21 extends from the floor 20c when the wire harness is received in the receptacle 20d. In more particular embodiments, each second wall 20b is structured to extend from the floor 20c a distance H1 of 35%±5% of the distance WH that the wire harness 21 extends from the floor 20c when the wire harness is received in the receptacle 20d.

Figure 3A:
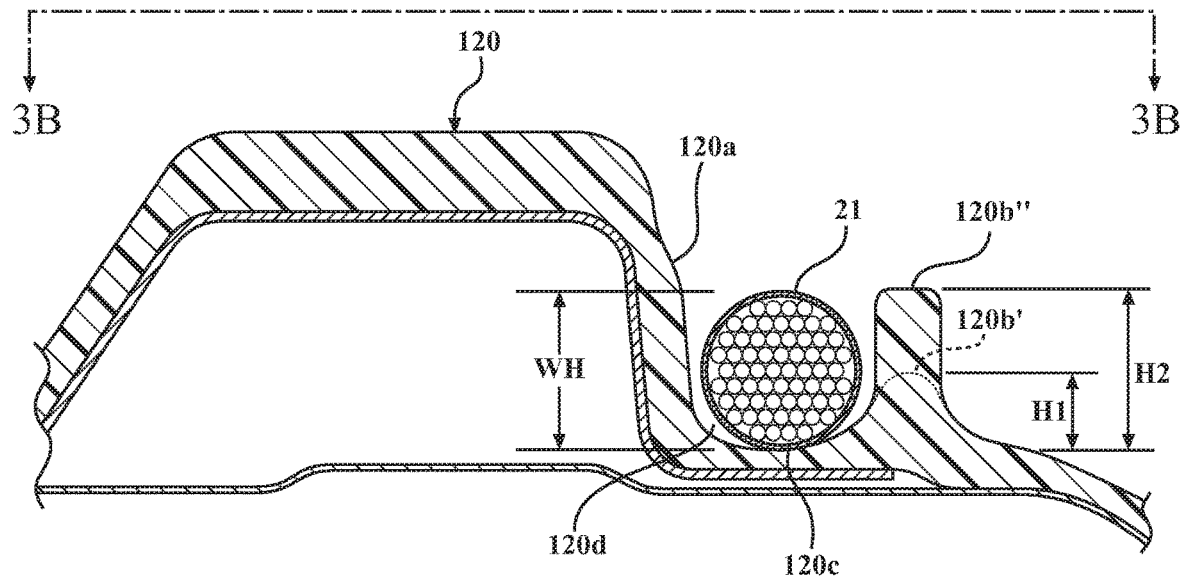
FIG. 3A is a cross-sectional view of a floor silencer in accordance with another embodiment described herein.
Figure 3B:
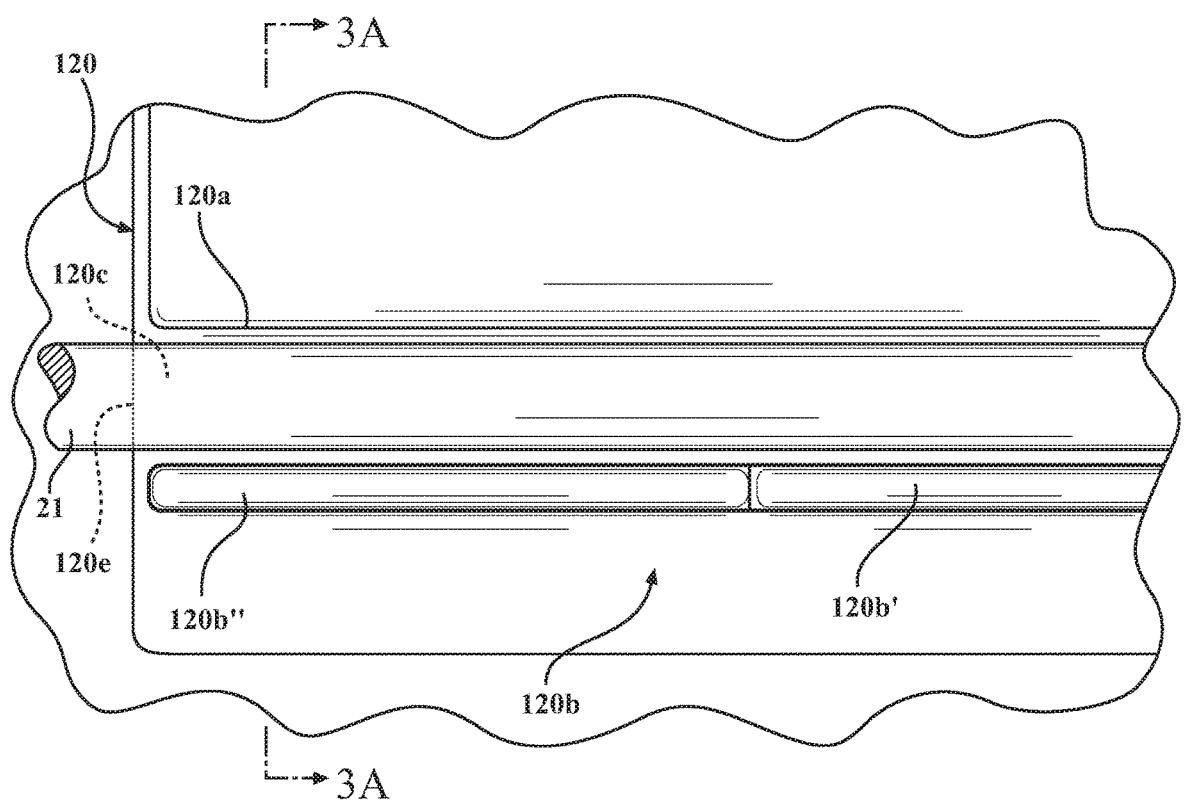
FIG. 3B is a plan view of a portion of the floor silencer shown in FIG. 3A.

FIGS. 3A and 3B show another particular embodiment 120 of the floor silencer. FIG. 3A is a cross-sectional view similar in orientation to the view of FIG. 1, and FIG. 3B is a plan view of a portion of the floor silencer 120 shown in FIG. 3A. The embodiment shown in FIGS. 3A-3B may be structured similarly to the embodiment shown in FIG. 1, except where stated otherwise.

In the embodiment shown in FIGS. 3A-3B, at least a first portion 120b' of the at least one second wall 120b extends a first distance H1 from the floor 120c, while a second portion 120b" of the at least one second wall 120b extends a second distance H2 from the floor 120c. In addition, the second distance H2 may be greater than the first distance H1. The taller second portion 120b" of the second wall 120b may reside adjacent an outer edge 120e of the floor silencer 120 (similar to, for example, a floor silencer edge 20e of FIG. 2A). In addition, another taller section of another second wall (not shown) may be positioned adjacent an opposite or otherwise different edge of the floor silencer 120. Such an arrangement may provide enhanced retention of the wire harness 21 in the receptacle 120d by providing higher second wall portions to decrease the chance of a portion of the wire harness exiting the receptacle 120d. In addition, providing enhanced retention of the wire harness at different, spaced-apart edges of the floor silencer may aid in retaining portions of the wire harness extending between the spaced-apart portions in the floor silencer.

In one or more arrangements, the second portion 120b" of the second wall 120b may be structured to extend from the floor 120c a distance H2 of about 100% of a distance WH that the wire harness 21 extends from the floor when the wire harness is received in the receptacle 120d. In more particular embodiments, the second portion 120b" of the second wall 120b may be structured to extend from the floor 120c a distance H2 of 100%±5% of the distance WH that the wire harness 21 extends from the floor 120c when the wire harness is received in the receptacle 120d.

Figure 4A:
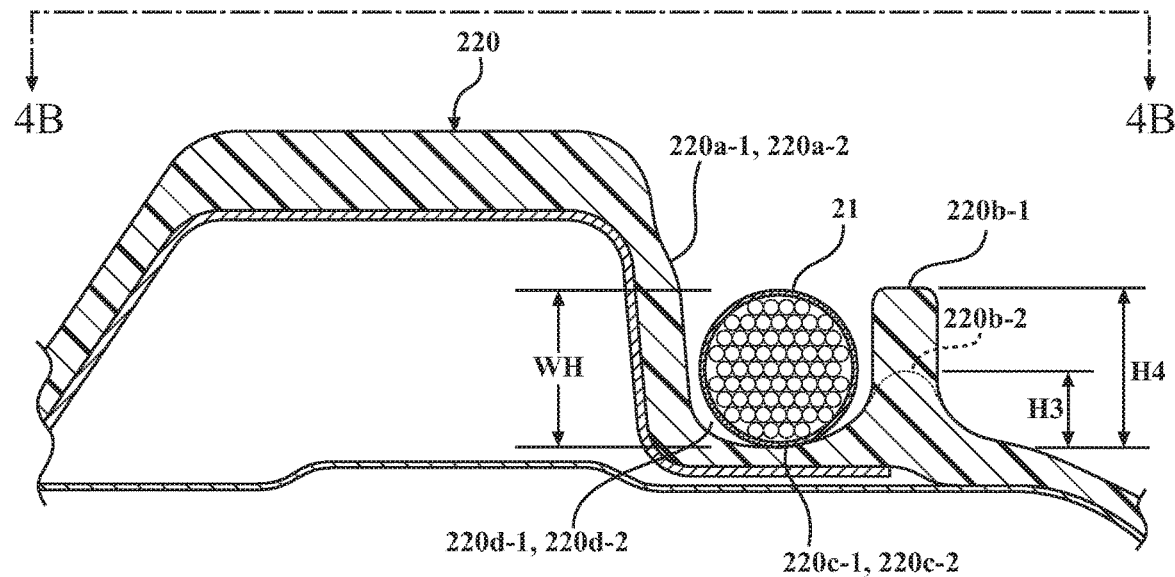
FIG. 4A is a cross-sectional view of a floor silencer in accordance with yet another embodiment described herein.
Figure 4B:
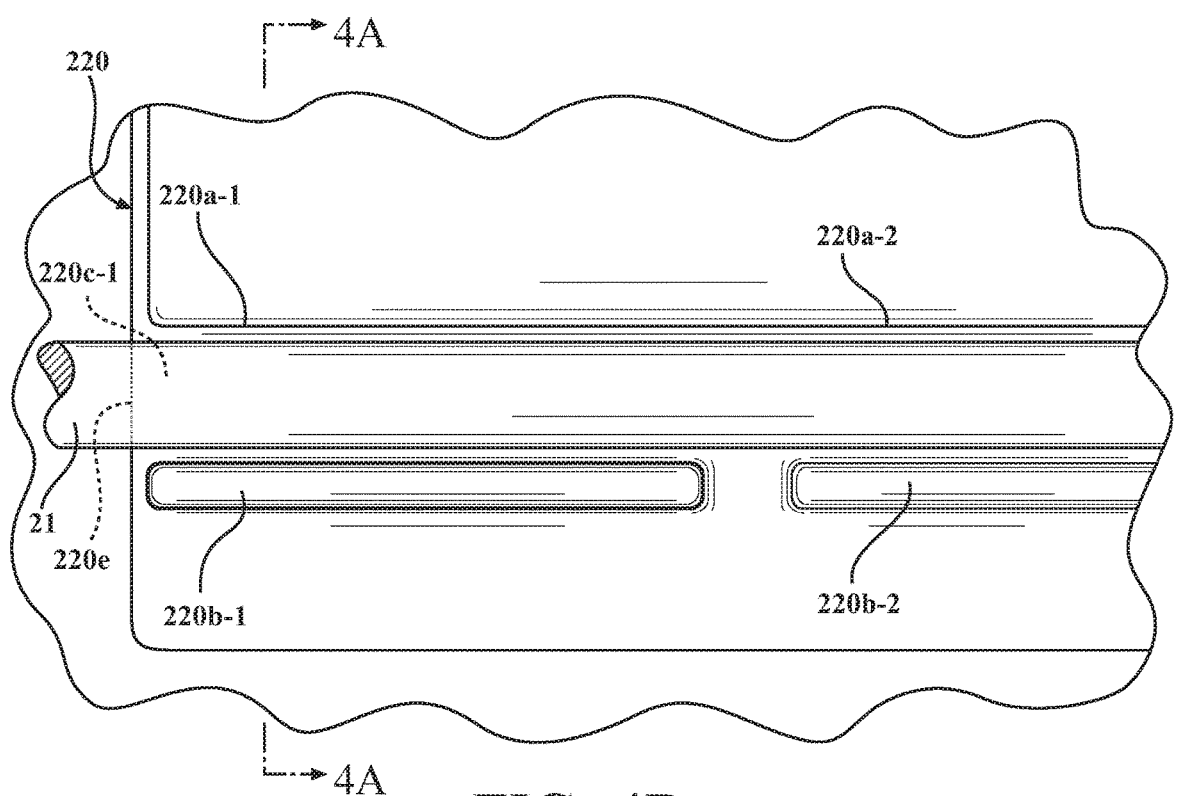
FIG. 4B is a plan view of a portion of the floor silencer shown in FIG. 4A.

FIGS. 4A and 4B show another embodiment 220 of the floor silencer. FIG. 4A is a cross-sectional view similar in orientation to FIG. 3A, and FIG. 4B is a plan view of a portion of the floor silencer 220 shown in FIG. 4A. The embodiment shown in FIGS. 4A-4B may be structured similarly to the embodiment shown in FIGS. 3A-3B, except where stated otherwise.

The embodiment shown in FIGS. 4A-4B may include at least first walls 220a-1, 220a-2, second walls 220b-1, 220b-2, and floors 220c-1, 220c-2 residing between associated ones of the first and second walls and forming associated receptacles 220d-1, 220d-2 as previously described. One second wall 220-b2 may be spaced apart from another second wall 220-b1. The one second wall 220-b2 may extend a first distance H3 from the 220c-2 floor, while other second wall 220-b1 extends a second distance H4 from the floor 220c-1. In addition, the second distance H4 may be greater than the first distance H3. The taller second wall 220b-1 may reside adjacent an outer edge 220e of the floor silencer 220 (similar to, for example, edge 20e of FIG. 2A). In addition, another taller second wall (not shown) may be positioned adjacent an opposite or different edge of the floor silencer 220. Such an arrangement may provide enhanced retention of the wire harness 21 in the associated receptacles 220d, by providing higher second wall portions to decrease the chance of a portion of the wire harness 21 exiting the receptacle(s) 220d.

In one or more arrangements, the other second wall 220b-1 may be structured to extend from the floor 220c-1 a distance H4 of about 100% of a distance WH that the wire harness 21 extends from the associated floor when the wire harness is received in the receptacle 220d-1. In more particular embodiments, the other second wall 220b-1 may be structured to extend from the floor 220c-1 a distance H4 of 100%±5% of the distance WH that the wire harness 21 extends from the floor when the wire harness is received in the receptacle 220d-1.

Figure 5A:
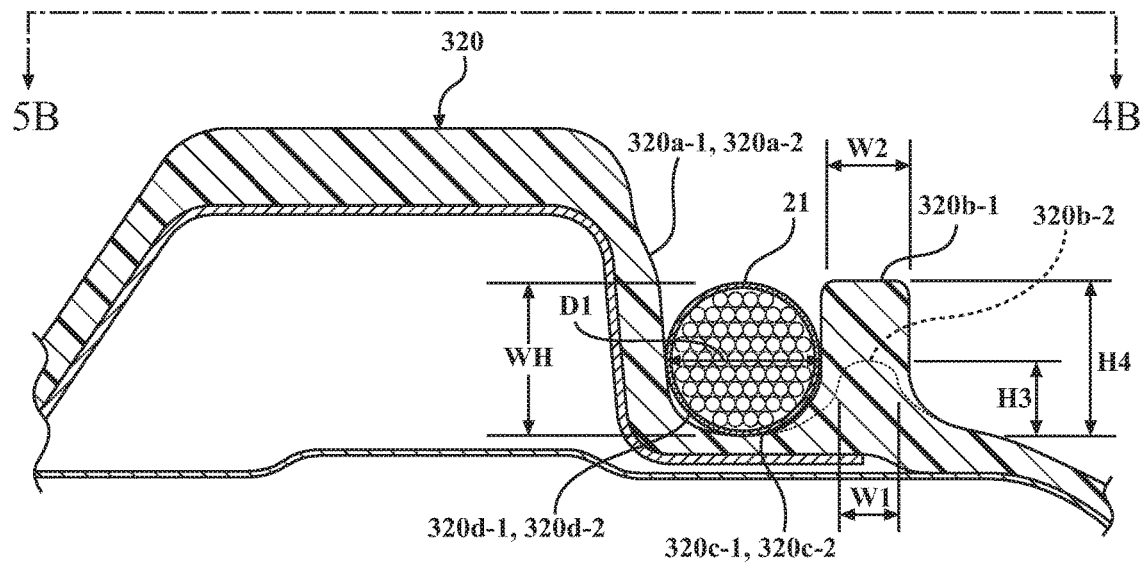
FIG. 5A is a cross-sectional view of a floor silencer in accordance with yet another embodiment described herein.
Figure 5B:
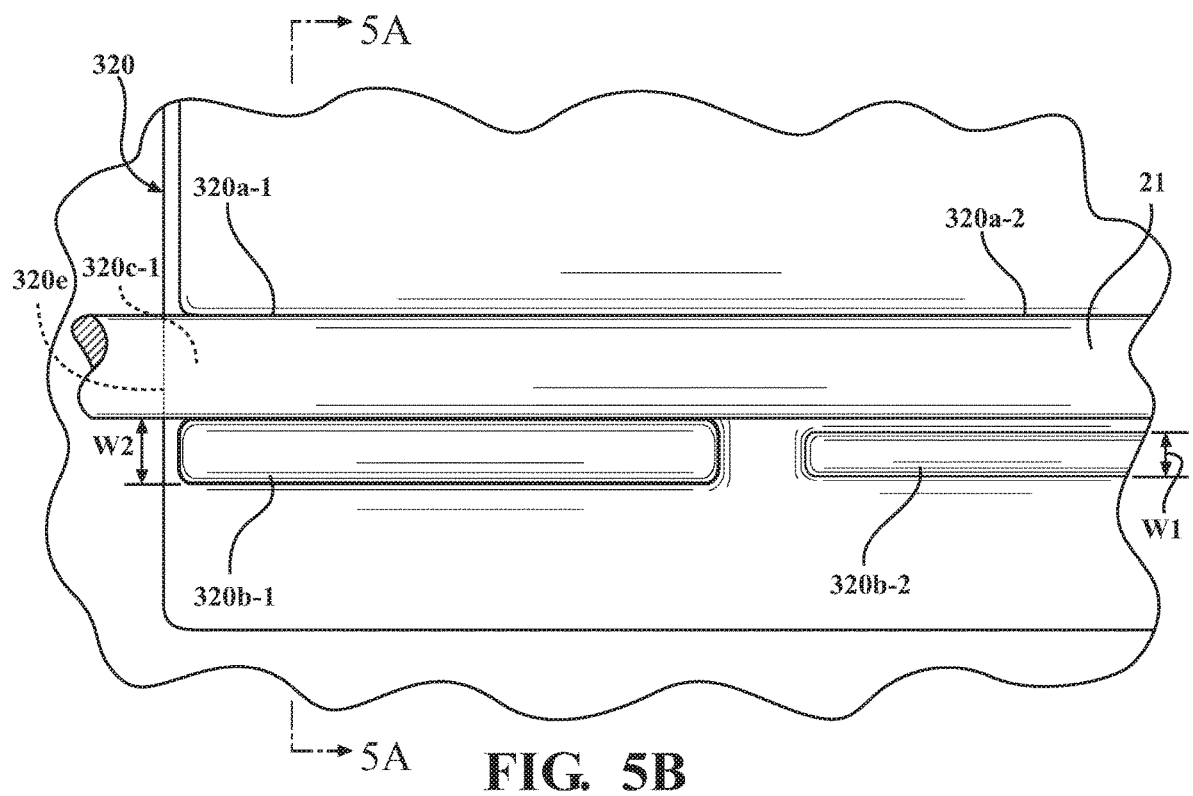
FIG. 5B is a plan view of a portion of the floor silencer shown in FIG. 5A.

FIGS. 5A and 5B show another embodiment 320 of the floor silencer. FIG. 5A is a cross-sectional view similar having an orientation to FIG. 3A, and FIG. 5B is a plan view of a portion of the floor silencer 320 shown in FIG. 5A. The embodiment shown in FIGS. 5A-5B may be structured similarly to the embodiment shown in FIGS. 4A-4B, except where stated otherwise.

The embodiment shown in FIGS. 5A-5B may include first walls 320a-1, 320a-2, second walls 320b-1, 320b-2, and floors 320c-1, 320c-2 combining to form associated receptacles 320d-1 and 320d-2 as previously described. One second wall 320-b2 may be spaced apart from another second wall 320-b1. In addition, one first wall 320a-2 and one second wall 320-b2 may be positioned opposite and spaced apart from each other, while another first wall 320a-1 and the other second wall 320b-1 may be positioned opposite and spaced apart from each other. The one second wall 320-b2 may have a first thickness W1, while other second wall 320-b1 may have a second thickness W2. Also, the second thickness W2 may be greater than the first thickness W1. The thicker second wall 320b-1 may reside adjacent an outer edge 320e of the floor silencer 320 (similar to, for example, edge 20e of FIG. 2A).

In the embodiment shown in FIGS. 5A-5B, the thickness W2 of other second wall 320b-1 may be dimensioned with respect to an outer diameter D1 of wire harness 21 and the spacing between the second wall 320b-1 and associated first wall 320a-1 such that the space between the first wall 320a-1 and the second wall 320b-1 is structured to receive the wire harness 21 therein so as to form an interference fit between the wire harness 21 and the first wall 320a-1 and second wall 320b-1.

Figure 6A:
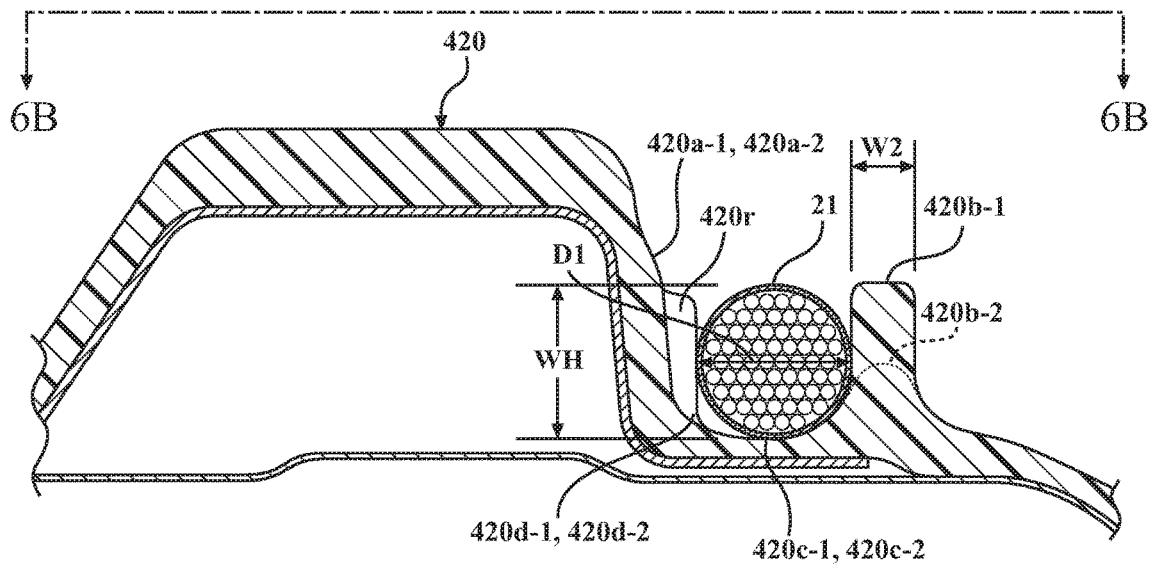
FIG. 6A is a cross-sectional view of a floor silencer in accordance with yet another embodiment described herein.
Figure 6B:
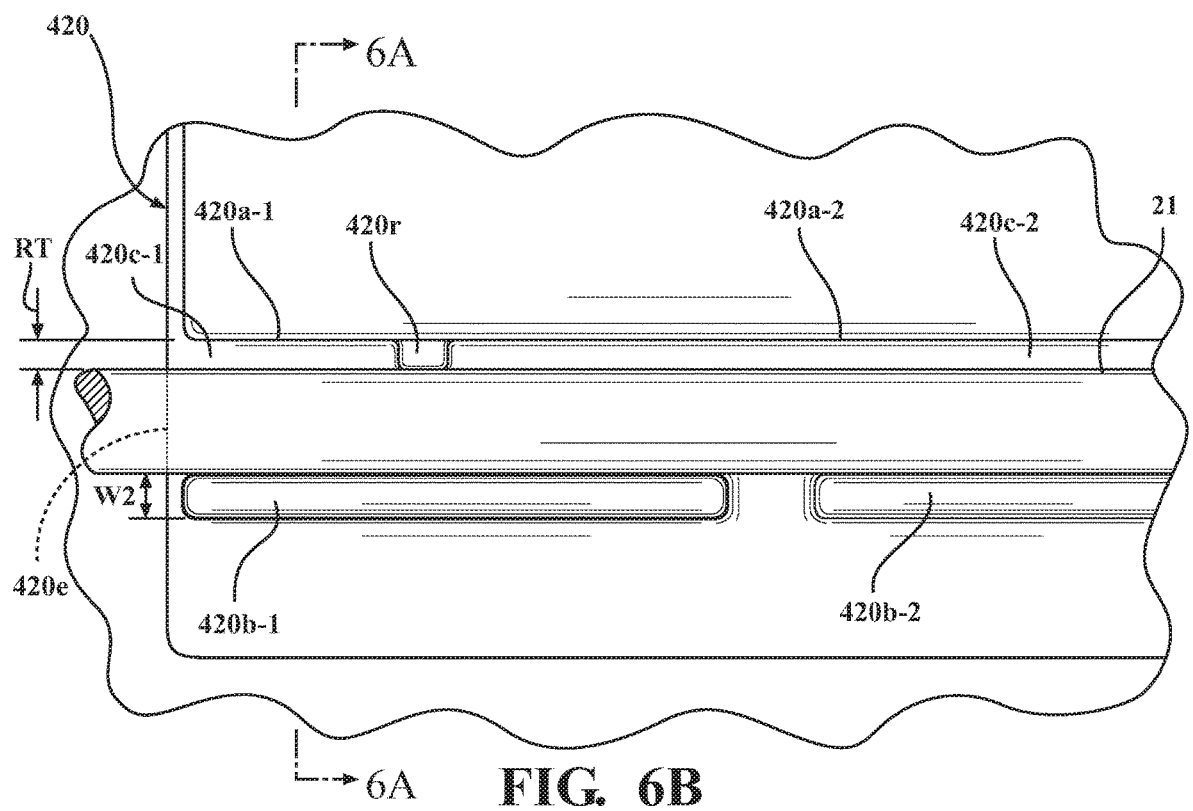
FIG. 6B is a plan view of a portion of the floor silencer shown in FIG. 6A.

FIGS. 6A and 6B show views of another embodiment 420 of the floor silencer similar to the embodiment shown in FIGS. 5A and 5B, except as otherwise noted. FIG. 6A is a cross-sectional view similar in orientation to the view of FIG. 5A, and FIG. 6B is a plan view of a portion of the floor silencer 420 shown in FIG. 6A.

The embodiment shown in FIGS. 6A-6B may include first walls 420a-1, 420a-2, second walls 420b-1, 420b-2, and floors 420c-1, 420c-2. One second wall 420-b2 may be spaced apart from another second wall 420-b1. The second walls 420b-1 and 420b-2 may have equal thicknesses W2 and equal spacings apart from associated first walls 420a-1 and 420a-2. In addition, a rib 420r may extend to a distance RT from first wall 420a-1.

In the embodiment shown in FIGS. 6A-6B, the dimension RT may be specified with respect to the outer diameter D1 of wire harness 21 and the spacing between the second wall 420b-1 and rib 420r such that the space between the second wall 420b-1 and rib 420r is structured to receive the wire harness 21 therein so as to form an interference fit between the wire harness 21 and the rib 420r and second wall 420b-1. The rib 420r may reside adjacent an outer edge 420e of the floor silencer 420 (similar to, for example, edge 20e of FIG. 2A). More than one rib may be used if desired, to increase retention forces. The dimension RT may also be changeable in the mold to adapt to different wire harness diameters.

In the above detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope of the invention.

What is claimed is:

1. A vehicle floor silencer comprising:
   at least one first wall;
   at least one second wall positioned opposite the at least one first wall; and
   at least one floor extending between the at least one first wall and the at least one second wall,
   the at least one first wall, the at least one second wall, and the at least one floor combining to define a receptacle structured to open in an upward direction and to receive a wire harness therein after the floor silencer has been positioned on a floor of a vehicle,
   wherein at least a first portion of the at least one second wall extends a first distance from the at least one floor, a second portion of the at least one second wall extends a second distance from the at least one floor, and wherein the second distance is greater than the first distance.

2. The vehicle floor silencer of claim 1 wherein the floor silencer has a semi-circular cross-sectional shape with a radius of curvature structured to be greater than an outer radius of a wire harness to be received in the receptacle.

3. The vehicle floor silencer of claim 1 further comprising at least one rib extending from the at least one first wall opposite the at least one second wall and in a direction toward the at least one second wall so as to form a gap between the at least one rib and the at least one second wall, and wherein the gap is structured to receive the wire harness therein so as to form an interference fit between the wire harness and the at least one rib and the at least one second wall.

4. A vehicle floor silencer comprising:
   a first wall;
   a second wall positioned opposite the first wall;
   a floor extending between the first wall and the second wall,
   the first wall, the second wall, and the floor combining to define a receptacle structured to open in an upward direction and to receive a wire harness therein after the floor silencer has been positioned on a floor of a vehicle; and
   another second wall spaced apart from the second wall, wherein the second wall extends a first distance from the floor, the other second wall extends a second distance from the floor, and wherein the second distance is greater than the first distance.

5. The vehicle floor silencer of claim 4 further including another first wall positioned opposite the other second wall, and wherein a space between the other first wall and the other second wall is structured to receive the wire harness therein so as to form an interference fit between the wire harness and the other first wall and the other second wall.

6. A vehicle floor silencer comprising:
   at least one first wall;

at least one second wall positioned opposite the at least one first wall; and at least one floor extending between the at least one first wall and the at least one second wall, the at least one first wall, the at least one second wall, and the at least one floor combining to define a receptacle structured to open in an upward direction and to receive a wire harness therein after the floor silencer has been positioned on a floor of a vehicle, wherein the at least one second wall is structured to extend from the at least one floor a distance of about 35% of a distance that a wire harness extends from the at least one floor when the wire harness is received in the receptacle.

7. The vehicle floor silencer of claim 6 wherein the second wall is structured to extend from the at least one floor a distance 35%±5% of a distance that the wire harness extends from the at least one floor when the wire harness is received in the receptacle.

* * * * *